Figure 1:
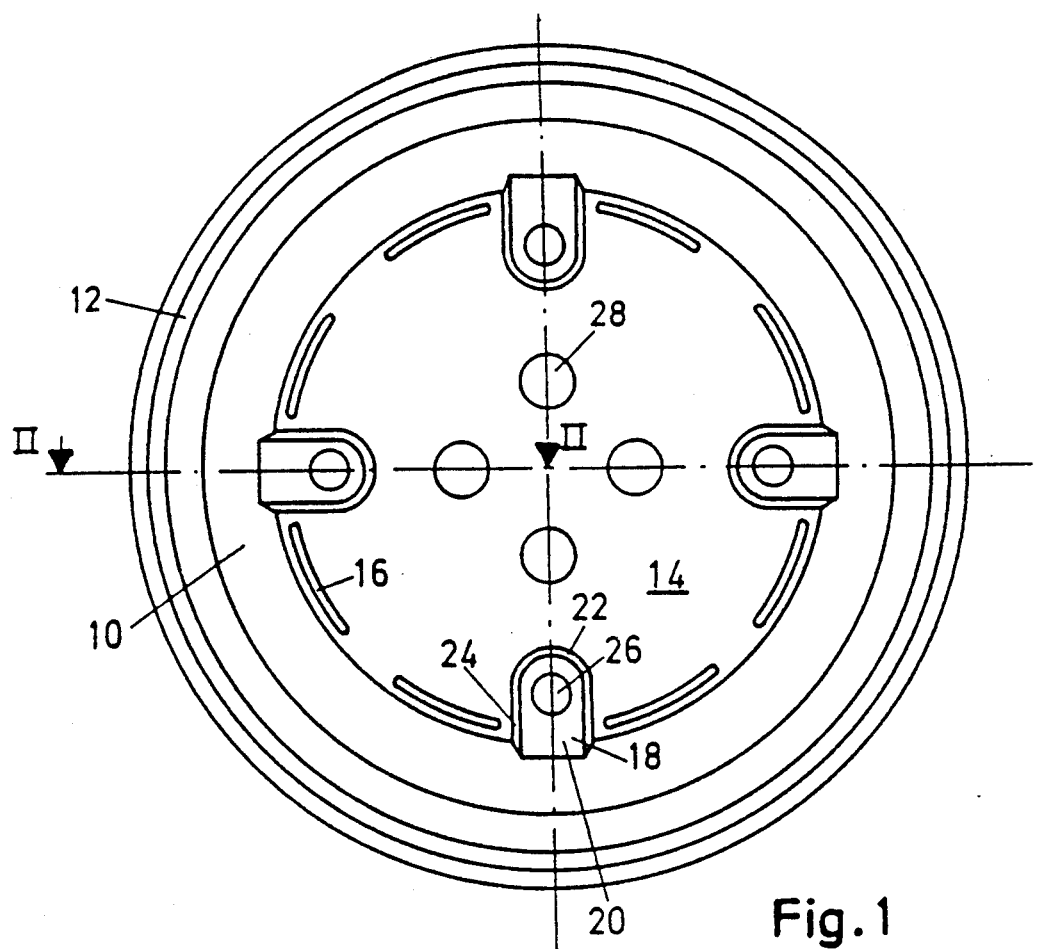

United States Patent [19]

Hougard

[11] Patent Number: 5,010,687
[45] Date of Patent: Apr. 30, 1991

[54] FLOWERPOT

[75] Inventor: Erling Hougard, Jyllinge, Denmark

[73] Assignee: OS Plastic A/S, Farum, Denmark

[21] Appl. No.: 566,808

[22] Filed: Aug. 10, 1990

Related U.S. Application Data

[63] Continuation of Ser. No. 266,222, Oct. 28, 1988, abandoned, which is a continuation of Ser. No. 829,059, Jan. 21, 1986, abandoned.

[30] Foreign Application Priority Data

May 23, 1984 [DK] Denmark ........ PCT/DK 84-00043

[51] Int. Cl.$^5$ .............................. A01G 9/02
[52] U.S. Cl. ........................... 47/79; 47/66; 47/63
[58] Field of Search ............... 47/66, 87, 68, 71, 85, 47/40, 33, 82, 83, 79, 86, 73, 59, 60, 61, 65, 63, 80, 81; 405/258

[56] References Cited

U.S. PATENT DOCUMENTS

| | | | |
|---|---|---|---|
| 19,406 | 11/1889 | Whilldin | 47/66 |
| 20,055 | 7/1890 | Whilldin | 47/66 |
| 20,336 | 11/1890 | Whilldin | 47/66 |
| 1,391,353 | 9/1921 | Wells | 47/71 |
| 1,775,831 | 2/1927 | Salisbury | |
| 2,810,234 | 10/1957 | Blackburn | 47/66 |
| 2,863,259 | 12/1958 | Radford | 47/80 |
| 3,053,010 | 9/1962 | DeShazor | 47/66 |
| 3,315,410 | 4/1967 | French | 47/66 |
| 3,800,469 | 4/1974 | Lau, Jr. et al. | 47/34 |
| 4,161,844 | 7/1979 | Hentschel et al. | 47/66 |
| 4,171,593 | 10/1979 | Bigglestone | 47/79 |
| 4,173,097 | 11/1979 | Staby | 47/66 |
| 4,735,016 | 4/1988 | Hougard | 47/80 |

FOREIGN PATENT DOCUMENTS

| | | | |
|---|---|---|---|
| 1712687 | 12/1955 | Fed. Rep. of Germany . | |
| 1836786 | 8/1961 | Fed. Rep. of Germany . | |
| 1896780 | 3/1964 | Fed. Rep. of Germany . | |
| 1582683 | 9/1970 | Fed. Rep. of Germany . | |
| 1932110 | 1/1971 | Fed. Rep. of Germany . | |
| 7220959 | 6/1972 | Fed. Rep. of Germany . | |
| 1507005 | 10/1974 | Fed. Rep. of Germany . | |
| 8105726 | 7/1983 | Netherlands | 47/59 |
| 60986 | 6/1937 | Norway . | |
| 77113 | 7/1950 | Norway . | |
| 128773 | 7/1950 | Sweden . | |
| 277547 | 12/1951 | Switzerland . | |
| 15061 | of 1901 | United Kingdom | 47/80 |
| 103027 | 1/1917 | United Kingdom . | |
| 1069101 | 5/1967 | United Kingdom . | |
| 1516384 | 5/1978 | United Kingdom . | |
| 2018115 | 10/1979 | United Kingdom . | |
| 2098044 | 11/1982 | United Kingdom | 47/66 |

Primary Examiner—Danton D. DeMille
Attorney, Agent, or Firm—Pennie & Edmonds

[57] ABSTRACT

A flowerpot, particularly for forcing plants while using automatic watering, comprising at its lowermost part at least one sideways-turning inlet (20) for cooperation with a bottom irrigation plant, said inlet (20) consitituting an access opening to a channel (18) extending under the pot, said channel having at least one sidewall (24) facing the filling of the pot, said sidewall—at a distance above the bottom of the pot (14)—being provided with at least one opening (26) for the passage of water. The channel (18) with the opening (26) may serve not only for supplying water to the pot filling and removal of water therefrom, but also as ventilation for the pot filling when the channel is not filled with water.

13 Claims, 4 Drawing Sheets

FLOWERPOT

This is a continuation of application Ser. No. 07/266,222, filed Oct. 28, 1988, now abandoned, which is a continuation of application Ser. No. 06/829,059, filed Jan. 21, 1986, now abandoned.

The invention concerns a flowerpot, particularly for forcing plants while using automatic watering, comprising at least one side-ways turning inlet for cooperation with a bottom irrigation plant, said inlet being placed at the lowermost part of the pot.

For automatisation of watering flowerpot cultures in large-scale market gardens is known the so-called bottom watering, and watering according to the flood/ebb principle while using the so-called "raise-lower" tables.

By bottom watering, the flowerpots stand with their perforated bottoms on a water-conducting mat, which is kept moist to let the moisture rise into the pot.

This method may have the disadvantage that the pot bottom and the mat surface come in close contact so as to cause problems of ventilation at the lowermost part of the pot, leaving the pot filling to become acid or the plant roots to rot.

Where "raise/lower" tables are used, the flowerpots are placed in flat-bottomed tanks which are periodically filled and subsequently drained of water, which is known as the flood/ebb principle. In comparison with the bottom watering method, the flood/ebb principle provides improved control of measuring and improved arbitrary control of the watering process dependent on the specific conditions prevailing.

But though this method implies that water is removed from the tank fairly quickly, it is not the same as the lowermost part of the pot filling, in particular, being relieved of excess water sufficiently quickly. The removal of excess water is, however, a prerequisite to good ventilation, particularly of the lowermost area of the pot filling. On the other hand, the flood/ebb principle offers the possibility of good access of air to the lowermost part of the pot as water is quickly removed from the area around the pot as described above.

An improvement in ventilation conditions has already been suggested as mentioned above by designing side-ways-turning openings at the lowermost part of the shell of the flowerpots in the immediate vicinity of the bottom of the pot, said openings serving the purposes of letting in water and draining off any excess water from the pot filling besides admitting ventilating air to the lowermost part of the pot. Experience has shown, however, that the removal of excess water and the desired improvements in ventilating conditions must often still be characterized as dissatisfactory.

The object of the invention is to establish how the problems of drainage and ventilation may be substantially improved, at the same time as also the advantages in particular of the flood/ebb principle are not only preserved, but may indeed be still better exploited. According to the invention this is achieved by the sideways turning inlet or inlets constituting an opening to a channel extending under the pot, said channel having at least one sidewall facing the filling of the pot, said sidewall extending at a distance above the bottom of the pot and being provided with at least one opening for the passage of water.

If such a flowerpot is used in connection with the flood/ebb principle, it means that the side opening in the pot shell designed for direct communication with the "raise/lower" table is preserved at the same time as the possibility of communication with the pot filling by means of the channel to which this side opening forms access, can be moved from the area direct at the pot shell to one or several areas chosen at random in the lowermost part of the pot dependent on how far the channel extends towards the interior from the opening and with how large or with how many passage openings the channel wall or walls are equipped. This will allow—on the basis of a standard type of pot—the production of different designs which, dependent on the size of the pot and/or the nature of plants to be grown, will accommodate not only requirements for optimum watering and drainage but also any related ventilating needs for procuring an optimum amount of moisture in the lowermost part of the pot and at the same time securing optimum ventilation also for the innermost parts of the pot filling.

The same pot will, however, also be well suited for use with the bottom watering method because of the mentioned openings for the passage of water and air being placed at the top of strictly limited channels; this means that outside the channels parts of the bottom of the pot proper are still available for arranging further passage openings or perforations through which the pot filling can establish direct contact with a water-conducting mat. The passage openings in the channels will thus serve to ventilate the pot filling at the same time.

According to the invention the access opening or openings may be placed between the supporting legs of the pot arranged along the rim of the bottom of the pot. This means that the pot will not be likely to turn over any more than a traditional flowerpot with no access openings for watering and ventilating channels.

According to the invention it is appropriate for the channel or channels to open downwards partly to facilitate the communication, partly to simplify the production of the pots.

According to the invention one design of the flowerpot comprises a number of channels arranged along the circumference of the pot, said channels extending from the side of the pot some distance transversely towards the interior of the pot and being barred by an end-wall at their end. This provides a good distribution of passage openings all the way around, predetermining at the same time how far towards the central part of the pot bottom—estimated from the rim of the pot—it is desirable to have the possibility of access for liquid or air to the pot filling.

In a second flowerpot design, the invention provides for the pot to have channel or channels extending transversely under the bottom of the pot, said channel or channels having an access opening at each of their extremities. In this way the liquid and air may be supplied direct to the central part of the pot bottom.

In yet another design of the flowerpot, the supporting legs of the pot may constitute external limitation shoulders for a ring channel or ring channel section extending in the vicinity of the periphery of the pot and having an internal limitation towards the central part of the bottom of the pot. This makes it possible to provide a fairly large area limited towards the central part of the bottom of the pot for placing passage openings in the outer area of the bottom of the pot.

According to the invention the supporting legs may constitute side limitations for the channel or channels, extending transversely of the rim of the pot. One of the advantages is that special channel side walls become superfluous and that the supporting legs may also, in a simple way, serve as distance elements which, when a number of empty pots are being nested into a stack, prevents said pots from being put too tightly together with consequential difficulties for a subsequent denesting when pots are to be used individually. The ribs may thus render special distance elements, such as projections, superfluous.

The invention is not committed to any particular shape of the channel cross section. As a rule, however, it will be trapezoid and with passage openings placed at the top, which makes it easy to produce this design.

In all designs the arrangement of openings for the passage of air and water is concealed to the spectator so as to let the pot preserve an attractive appearance. This is particularly true when comparing a flowerpot designed in accordance with the invention with the above mentioned known pot in which the openings for the passage of water and air are placed as side openings in the shell of the pot proper as the latter placing of passage openings may quickly result in the pot filling and roots protruding through the side openings. This will quickly make the pot develop a rather unattractive appearance, and besides the sideways-protruding roots make it difficult to remove the plant with its root from the pot. Moreover, side openings of this type are difficult to mould. All these disadvantages are countered in the pot according to the invention.

Figure 7:
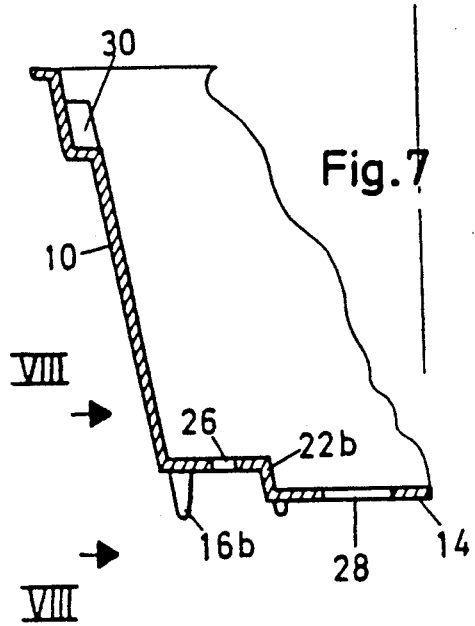
Figure 8:
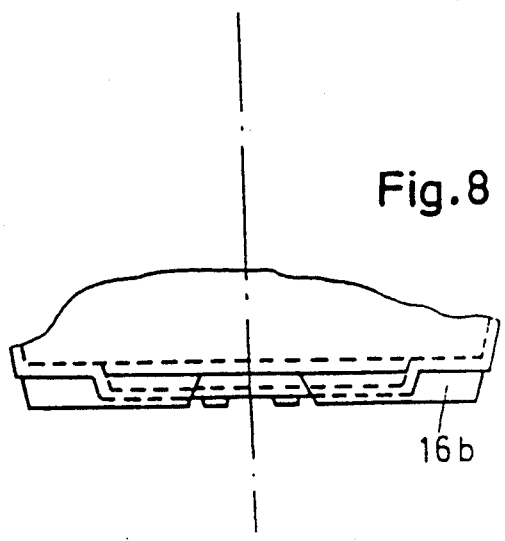
Figure 10:
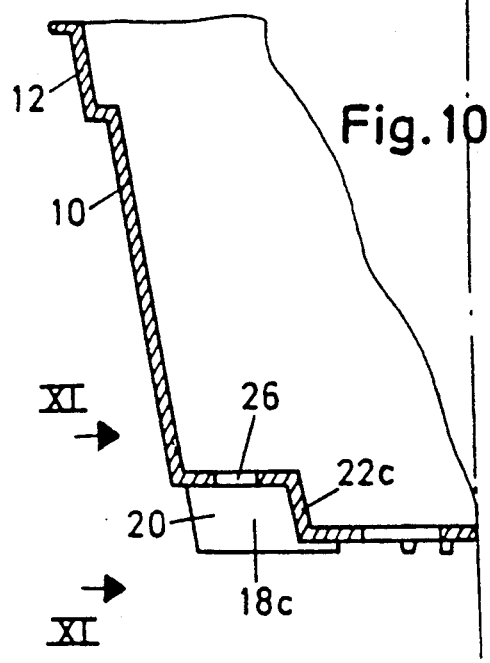
Figure 11:
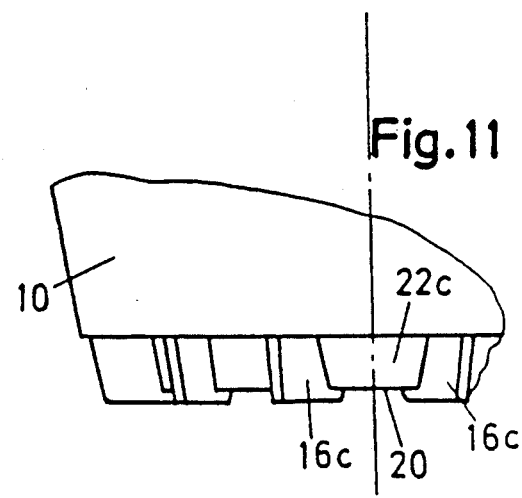

The invention is described in the following with reference to the drawing on which FIG. 1 shows a design for a flowerpot according to the invention, viewed from the bottom, FIG. 2 a section according to the line II—II in FIG. 1, FIG. 3 a section according to the line III—III in FIG. 2, FIG. 4 a second design of the flowerpot, viewed from the bottom, FIG. 5 a section according to the line V—V in FIG. 4, FIG. 6 a third design of the flowerpot, viewed from the bottom, FIG. 7 a section according to the line VII—VII in FIG. 6, FIG. 8 a section according to the line VIII—VIII in FIG. 7, FIG. 9 a fourth design of the flowerpot, viewed from the bottom, FIG. 10 a section according to the line X—X in FIG. 9, and FIG. 11 a section according to the line XI—XI in FIG. 10.

All illustrated designs of the flowerpot according to the invention have been especially developed with a view to forcing plants while using automatic watering. The pots consist of a shell 10 having a rim shoulder 12 at the top, and having a bottom 14 at the lower part. The underside of the pot is provided with supporting legs 16.

In the design shown in FIG. 1, the bottom has a number of channels 18 with openings extending downwards, said channels projecting from a sideways-turning opening 20 placed at the lower part of the pot shell 10 some distance transversely under the pot and being barred by an end-wall 22 at their inner end. The channels have a trapezoid cross section and in their top limitation wall 24 turning towards the pot filling, they are designed with openings 26 for the passage of water at a distance above the bottom of the pot 14.

In the present design, the passage openings 26 are circular with one opening being provided for each channel 18. The passage openings may, however, also be of a different shape, for instance oblong, and there may be several passage openings for each channel.

Figure 2:
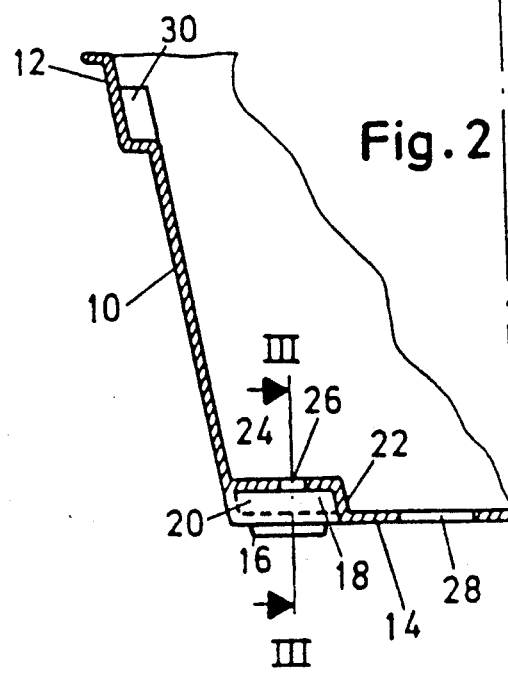
Figure 3:
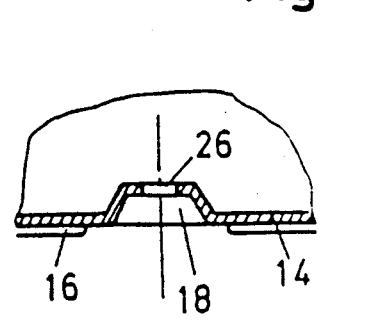

The bottom of the pot proper is designed with other passage openings 28, and it will appear from FIG. 2 that these openings 28 are barred from direct communication with the passage openings 26 by the walls of the channel 18. This means that the pot is immediately useful for bottom watering when placed with the bottom 14 on a watering mat; liquid to the pot filling will then be supplied through the passage openings 28. At the same time the passage openings 28 will act as ventilating holes.

If the pot is used in connection with the flood/ebb principle, the passage openings 26 will, in the flood state, act for the supply of liquid to the pot filling and, in the ebb state, act for the removal of water from the pot filling with subsequent ventilation of the lowermost part of the pot. This effect may to some extent be supplemented by the passage openings 28 placed at the bottom 14.

The supporting legs 16 are designed as ribs shaped as segments of a circle and the channels 18 with their access openings 20 are placed between opposite-turning ends of two nabouring ribs, see FIG. 1.

The inside of the rim shoulder 12 is provided with distance projections 30 which prevent a number of pots from being put too tightly together when stacked since the shoulder 12 of a superjacent pot will rest on the projections 30 of a subjacent pot.

Figure 4:
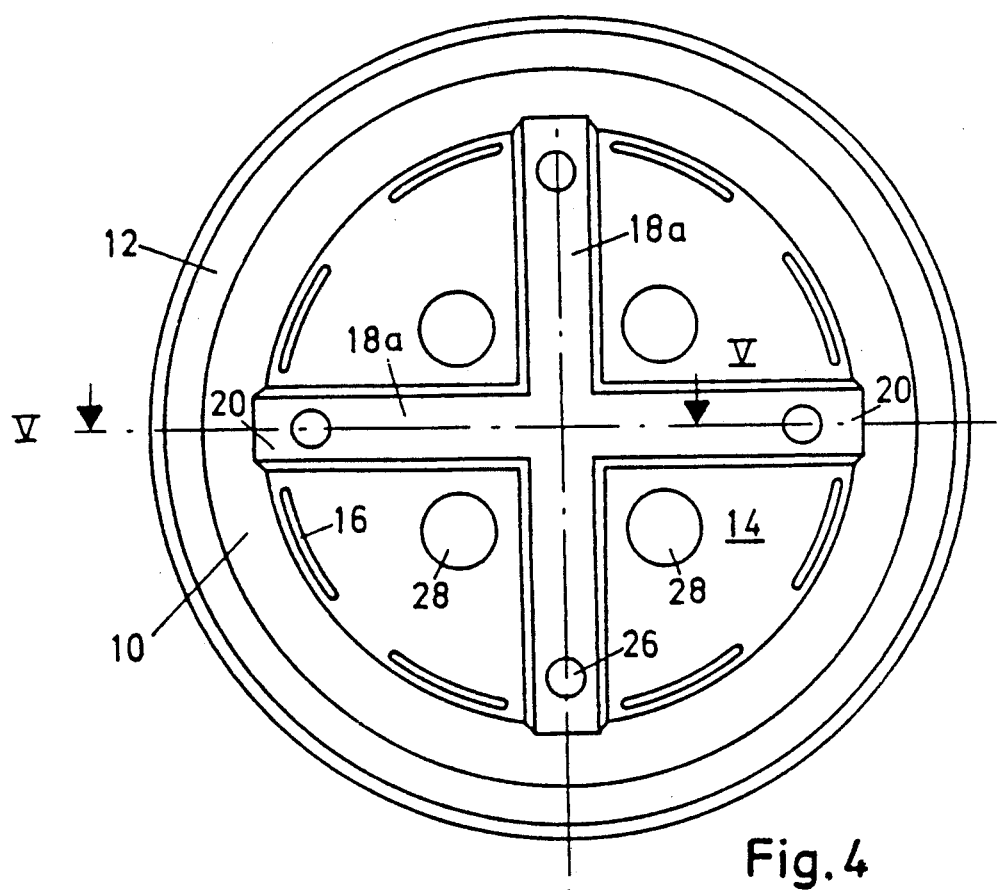
Figure 5:
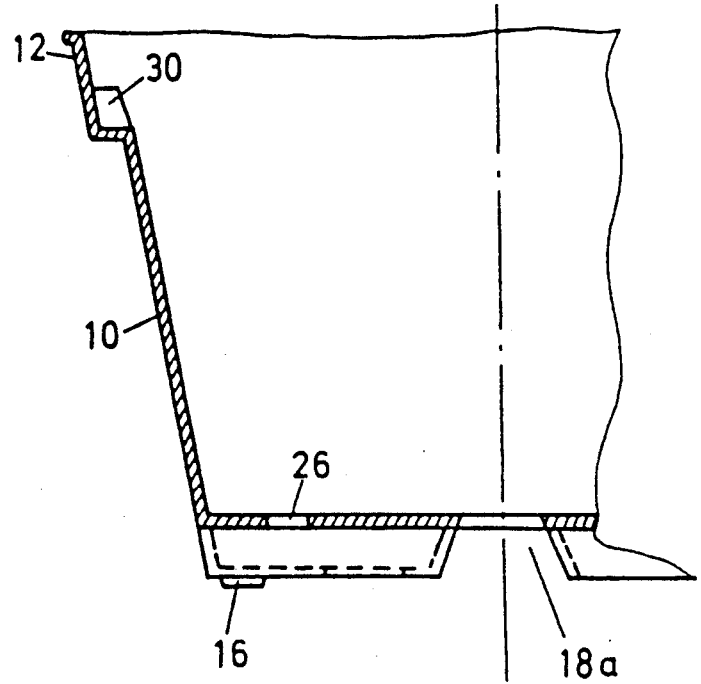

The design shown in FIG. 4 differs from the design shown in FIG. 1 in that instead of channels 18 with limited radial length, those of the present design are diametric and transversely through-going channels 18a extending transversely under the bottom of the pot, said channels having an access opening 20 at each of their extremities. In all other respects, the design corresponds to the one shown in FIGS. 1 and 3 and to the description of the latter.

Figure 6:
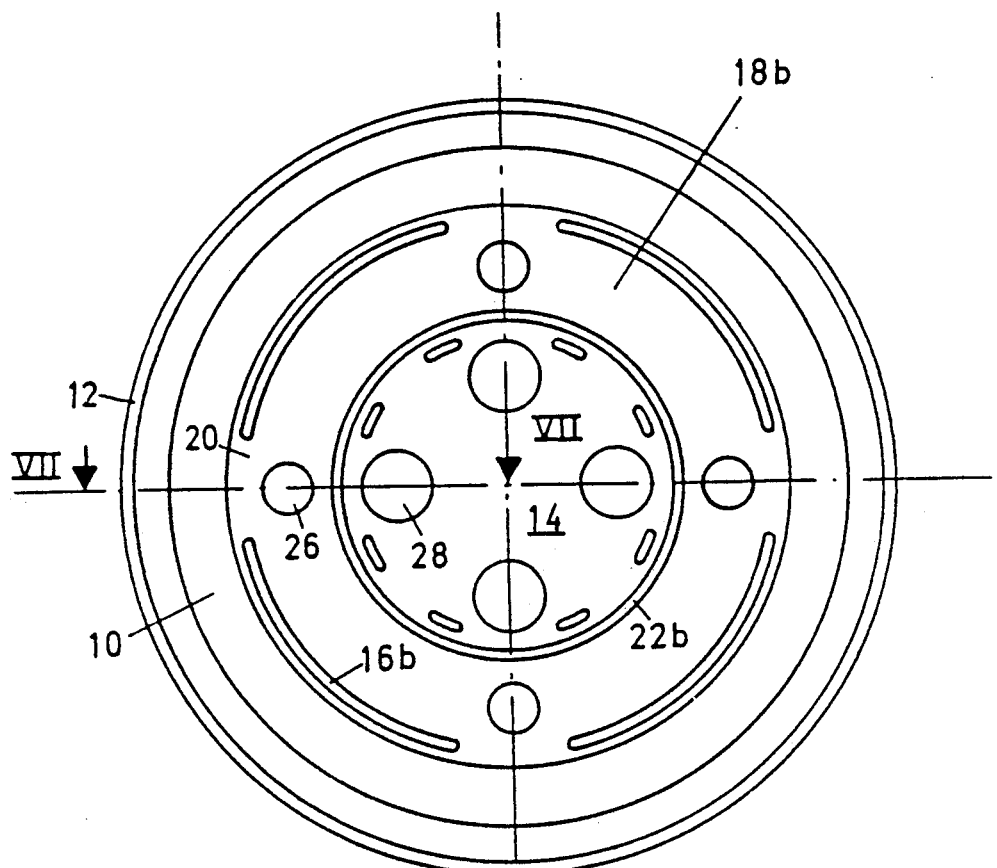

The design shown in FIG. 6 differs from the ones shown in FIGS. 1 and 4 is that instead of transverse channels 18 or 18a, it has arcuate channel segments defining a kind of ring channel 18b, defined on the inner side by an encircling limitation wall 22b, which limits the channel in relation to the receiver bottom 14, said bottom being provided with passage openings 28, and which on the outer side is defined by curved ribs 16b shaped as segments of an angle and acting as supporting legs for the pot. The opposite-turning ends of two neighbouring ribs 16b form the side limitation for the sideways-turning openings 20, which constitute the access openings for channel 18b. As shown in FIG. 7 this channel, too, has a trapezoid cross section with passage openings 26 being placed in the top wall of the channel. In all other respects this design is subject to the same observations as stated in connection with FIGS. 1 to 3.

Figure 9:
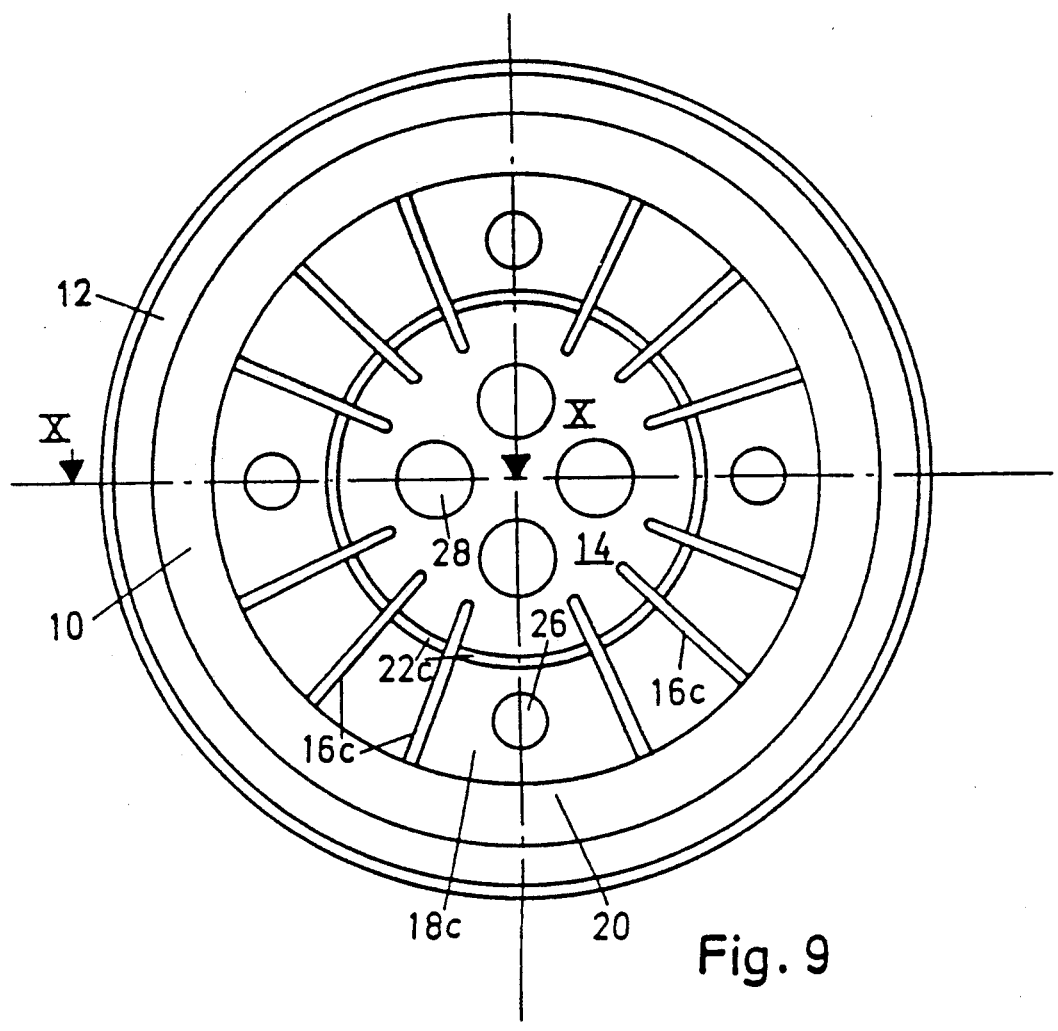

The design in FIG. 9 differs from the above three designs in that the supporting legs proper constitute both two side limitations for the channels, said supporting legs being formed by a number of cross ribs 16c arranged along the circumference of the pot, said ribs being placed as radial ribs in the shown design. Two such ribs combined limit a channel 18c, and according to the illustration at least some of the top walls of these channels are provided with passage openings 26. Channels 18c are like channels 18 barred by an end-wall 22c at their inner end. In this design the rim shoulder 12 is not provided with distance projections 30 since the supporting legs 16c may also constitute distance elements between any two pots nested into each other by the superjacent pot resting its supporting legs on the top wall of the channel part 18c of the subjacent pot. In all other respects this design is subject to the same observations as stated in connection with FIGS. 1 to 3.

I claim:

1. A flowerpot comprising a sidewall; a substantially plane bottom having at least one opening for the passage of water thereinto; at least one inlet located in said flowerpot sidewall at the lowermost part of the pot for cooperation with a bottom irrigation plant, said inlet providing access to a channel having a top wall portion and first and second sidewall portions, said top portion extending a distance above the bottom of the pot, being arranged essentially parallel to said bottom, and said top portion provided with at least one opening for the passage of air and water, and a plurality of supporting legs arranged on the bottom of the pot extending radially from the sidewall of the pot; wherein at least two of said supporting legs comprises said first and second sidewall portions of said channel.

2. A flowerpot for cooperation with bottom irrigation plants, advantageously configured for use in both the water-conducting-mat system and the flood/ebb method of large scale bottom irrigation comprising:

a sidewall;

a substantially plane bottom having at least one opening for the passage of water thereinto;

a channel having a top wall portion extending to a distance above said bottom and being arranged essentially in parallel to said bottom, said top wall portion being provided with at least two openings for passage of air and water in either direction between an interior of said pot and said bottom, said channel further having a first and a second sidewall portion extending from said top wall portion towards said bottom;

at least one inlet in said flowerpot sidewall at the lowermost part of the pot for allowing air and water to access said channel; and a plurality of supporting legs arranged on the bottom of the pot;

wherein at least two of said supporting legs constitute said first and second channel sidewall portions and extend radially from the sidewall of the pot, and said channel including an end wall portion which separates said top wall portion opening from said bottom opening to provide watering areas on two separate and distinct parallel planes such that when used in the water-conducting-mat system, water will access from said mat to the pot interior through the bottom opening, while the top portion opening simultaneously provides ventilation means, and wherein the combination of top wall portion and bottom openings facilitates rapid drainage required for beneficial results when using the flood/ebb system.

3. A flowerpot for cooperation with bottom irrigation plants, advantageously configured for use in both a water-conducting-mat system and a flood/ebb method of large scale bottom irrigation, comprising:

a sidewall;

a substantially plane bottom having at least four bottom openings for the passage of water thereinto; and four channel segments, each of said segments having a top portion extending at a distance above said bottom and being arranged essentially in parallel to said bottom, each of said top wall portions being provided with at least one opening for passage of air and water in either direction between an interior of the pot and said bottom, and said flowerpot sidewall including four inlets at the lowermost part of the pot for allowing air and water to access each of said channel segments, wherein said channel segments include sidewall portions which separate said top wall portion openings from said bottom openings to provide watering and ventilation areas onto two separate and distinct parallel planes so that when said pot is used in the water-conducting-mat system, water will access from said mat to the pot interior through the bottom openings, while the top wall portion openings simultaneously provide ventilation means, and wherein the combination of top wall portion and bottom openings facilitate rapid drainage as required for beneficial results when using the flood/ebb method.

4. A flowerpot according to claim 3 further characterized by having supporting legs arranged on the bottom of the pot on opposite sides of said inlets.

5. A flowerpot according to claim 4 wherein said channel segments are arranged around the circumference of the pot, said segments extending radially from said sidewall towards the center of the bottom.

6. A flowerpot according to claim 5 wherein adjacent channel segments are perpendicular to one another.

7. A flowerpot according to claim 6 wherein said channel segments intersect.

8. A flowerpot according to claim 4 wherein said channel segments are arcuate.

9. A flowerpot according to claim 4 wherein at least two of said supporting legs comprises said channel sidewall portions.

10. A flowerpot comprising a sidewall; a substantially plane bottom having at least one opening for the passage of water thereinto; a plurality of inlets located in said flowerpot sidewall at the lowermost part of the pot for cooperation with a bottom irrigation plant, said inlets providing access to a plurality of channels extending radially from the sidewall towards the center of the bottom and terminating in and end wall at an inner end, each channel having a top wall portion and a sidewall portion; said top wall portion extending to a distance above the bottom of the pot, being arranged essentially parallel to said bottom, and said top wall portion being provided with at least one opening for the passage of air and water, and said side wall portion extending from said top wall portion towards said bottom and separating said top wall portion opening from said bottom opening; and a plurality of supporting legs arranged on the bottom of the pot on two opposing sides of each said inlet.

11. A flowerpot for cooperation with bottom irrigation plants, advantageously configured for use in both a water-conducting-mat system and a flood/ebb method of large scale bottom irrigation, comprising:

a sidewall;

a substantially plane bottom having at least four bottom openings for the passage of water thereinto;

four channel segments arranged around the circumference of the pot and extending radially from said sidewall towards the center of the bottom, wherein adjacent channel segments are perpendicular to one another, each of said segments being barred by an end wall at an inner end, and having a top wall portion extending from a distance above said bottom and being arranged essentially in parallel to said bottom, each of said top wall portions being provided with at least one opening for passage of air and water in either direction between an interior of the pot and said bottom, and said flowerpot sidewall including four liquid inlets at the lowermost part of the pot for allowing water to access each of said channel segments, wherein said channel segments include sidewall portions which separate said top wall portion openings from said bottom openings to provide watering and ventilation areas on two separate and distinct parallel planes so that when said pot is used in the water-conducting-mat system, water will access from said mat to the pot interior through the bottom openings, while the top wall portion openings simultaneously provide ventilation means, and wherein the combination of top wall portion and bottom openings facilitate rapid drainage as required for beneficial results when using the flood/ebb method; and supporting legs arranged on the bottom of the pot on opposing sides of each said liquid inlets.

12. A flowerpot comprising a sidewall; a substantially plane bottom having at least one opening for the passage of water thereinto; at least two inlets located in said flowerpot sidewall at the lowermost part of the pot for cooperation with a bottom irrigation plant, said inlets providing access to a channel extending across the diameter of the pot, said channel having a top wall portion and a sidewall portion, said top wall portion extending to a distance above the bottom of the pot, being arranged essentially parallel to said bottom, and said top wall portion being provided with at least two openings for the passage of air and water, and said sidewall portion extending from said top wall portion towards said bottom and separating said top wall portion opening from said bottom opening; and a plurality of supporting legs arranged on the bottom of the pot at least one of said supporting legs being arranged on each opposing side of each said inlet.

13. A flowerpot for cooperation with bottom irrigation plants, advantageously configured for use in both the water-conducting-mat system and the flood/ebb method of large scale bottom irrigation comprising:

a sidewall;

a substantially plane bottom having at least one opening for the passage of water thereinto;

a channel extending across the diameter of the pot and having first and second ends, a top wall portion, and a sidewall portion extending from said top wall portion towards said bottom, said top wall portion extending to a distance above said bottom and being arranged essentially in parallel to said bottom, said top wall portion being provided with at least two openings for passage of air and water in either direction between an interior of said pot and said bottom;

at least two inlets in said flowerpot sidewall at the lowermost part of the pot, said inlets located at and positioned in communication with said first and second ends of said channel for allowing air and water to access said channel; and a plurality of supporting legs arranged on the bottom of the pot at least one of which being arranged on each opposing side of each said inlet;

wherein said channel sidewall portion separates said top wall portion opening from said bottom opening to provide watering areas on two separate and distinct parallel planes such that when used in the water-conducting-mat system, water will access from said mat to the pot interior through the bottom opening, while the top wall portion opening simultaneously provides ventilation means, and wherein the combination of top wall portion and bottom openings facilitates rapid drainage required for beneficial results when using the flood/ebb system.

* * * * *